United States Patent [19]

Chan et al.

[11] Patent Number: 4,812,859

[45] Date of Patent: Mar. 14, 1989

[54] MULTI-CHAMBER INK JET RECORDING HEAD FOR COLOR USE

[75] Inventors: C. S. Chan; Gary E. Hanson; Terry M. Nelson, all of Boise, Id.

[73] Assignee: Hewlett-Packard Company, Palo Alto, Calif.

[21] Appl. No.: 98,840

[22] Filed: Sep. 17, 1987

[51] Int. Cl.⁴ .............................................. G01D 15/18

[52] U.S. Cl. .............................................. 346/140 R

[58] Field of Search .................................. 346/140, 75

[56] References Cited

U.S. PATENT DOCUMENTS

| | | | |
|---|---|---|---|
| 4,300,144 | 11/1981 | Isayama | 346/140 |
| 4,320,406 | 3/1982 | Heinzl | 346/140 |
| 4,564,846 | 1/1986 | Siegal | 346/140 X |
| 4,593,296 | 6/1986 | Dagna | 346/140 |
| 4,611,219 | 9/1986 | Sugitani | 346/140 |
| 4,665,409 | 5/1987 | Behrens | 346/140 |
| 4,683,481 | 7/1987 | Johnson | 346/140 |
| 4,728,968 | 3/1988 | Hillmann | 346/140 |
| 4,734,717 | 3/1988 | Rayfield | 346/140 |

OTHER PUBLICATIONS

Hewlett-Packard Journal, May 1985, vol. 36, No. 5.

*Primary Examiner*—Joseph W. Hartary

*Attorney, Agent, or Firm*—William J. Bethurum

[57] ABSTRACT

A multichamber ink jet pen has a printhead comprising a plurality of nozzle groups corresponding in number to the number of chambers. The nozzle groups are respectively in communication with the individual chambers for receiving ink. The multi-color ink jet pen is retrofittable in a single color printer to provide multicolor printing capability. The nozzles in the nozzle groups are formatted to correspond to the nozzle format in the printhead of the single color ink jet pen, including the same nozzle spacing, to take advantage of the single color printer control for that nozzle format. The nozzle groups each duplicate a different longitudinal segment of the single color nozzle column pattern. The nozzle groups are staggered in the scan direction and the end nozzles in the respective groups have the same longitudinal spacing therebetween as the nozzles in the nozzle columns to duplicate the nozzle spacing of the single color nozzle column pattern within and between the nozzle groups of the multi-color recording head.

11 Claims, 6 Drawing Sheets

3/6

5/6

MULTI-CHAMBER INK JET RECORDING HEAD FOR COLOR USE

BACKGROUND OF THE INVENTION

1. Field of the Invention

This invention relates to multi-chamber ink jet recording heads providing ink isolation and selective access to differing colors of ink in the respective chambers for printing text or graphics. More particularly, this invention is directed to a multi-chamber ink jet recording head having an improved nozzle plate employing nozzle formats in individual nozzle groups, corresponding to those of a single color recording head with which it is interchangeable.

2. Description of the Related Art

Ink jet recording heads are used in printers and plotters. These include thermal and piezoelectric types for expelling ink. The term printer as used herein is used as a term of convenience and is not intended to exclude other types of recording such as plotting.

Black ink is used in most printing applications, but there is a developing need for the use of colored inks in printing text and graphics. Heretofore, printers having recording heads designed for single color printing have not been retrofitted with color recording heads which may be interchangeably fittable in the printer carriage designed for the single color recording head, because of differing requirements resulting from pen body configurations, usually larger for accommodating several colors of ink, nozzle spacing and grouping, and control requirements, to name a few. While multicolor recording heads can be provided with a chamber for black ink, where a printer is predominately used for black text or graphics, a supply of black ink in a multicolor recording head fitting an all black or other single color recording head carriage mount is limited in volume. Thus interchangeable single color/multicolor recording heads in a printer increase the utility of an otherwise single color printer or recorder.

U.S. Pat. Nos. 4,511,907; 4,540,996; 4,611,219; 4,630,076 and 4,631,548 are related to this invention in the sense that they are all directed to multi-color ink jet printers. None of these, however, appear to teach or to suggest a configuration for a multicolor recording head which is interchangeable with a single color recording head in a single color printer.

U.S. Pat. No. 4,511,907 describes a color printer having a plurality of recording heads arranged in a horizontal direction, the nozzles in each being arranged in a vertical direction. The signals for printing are delayed for the second and subsequent recording heads by the time required for the carriage to move the distance between the first recording head and the second or subsequent recording heads.

U.S. Pat. No. 4,540,996 describes the positioning of a plurality of different color recording heads in the scan direction with respect to one another and the nozzles in each in terms of dot intervals for the purpose of defining an arrangement preventing double recording.

U.S. Pat. No. 4,611,219 describes a liquid jetting printer comprising a plurality of perforated plates providing two channel isolation with alternate ink passages for thermal ink jet operation.

U.S. Pat. No. 4,630,076 describes a multicolor recording head having horizontally spaced nozzle groups, each of which includes a row of nozzles inclined at an angle to the horizontal. An arrangement is described employing white or transparent dot over printing of a previously deposited color dot to cause color bleeding for achieving color tinting.

U.S. Pat. No. 4,631,548 provides a plurality of ink reservoirs for different colors of ink in an ink jet printer. Multicolor images are printed using the dot matrix principle. Dot diameter is controlled, either by adjusting the volume of ink in each droplet inversely with a number of droplets in a matrix dot, or preselecting a constant volume for the droplets and using the same number of the same or different colors of droplets in forming each matrix dot.

All of the patents aforesaid are related to this invention in the use of individual nozzle groups for differing colors and in the employment of dot matrix techniques for printing. None, however, are concerned with the interchangeability of a multicolor recording head with a single color recording head in a single color printer, particularly as to the arrangement of the nozzle formats in the respective nozzle groups for each chamber in the multichamber reservoir of the pen.

SUMMARY OF THE INVENTION

A multi-chamber ink jet recording head or pen for color use is provided which is retrofittable to a single color ink jet printer. A nozzle layout is provided such that even size paper steps in the paper feed direction allows full color printing with only about a 3% reduction in printable area. Color separation is provided in the printhead of the multicolor pen by staggering the individual color groups of nozzles in the scan direction while maintaining the same dot per inch spacing of the nozzles within the groups and between the groups as in the nozzle spacing in the single color printhead of the single color pen Construction of the multi-color ink jet pen is essentially the same as that of the single color pen especially as to size and external configuration and as to the pen mounting details in the pen carriage. Only changes are made in the interior of the ink reservoir to provide for the isolated storing of four colors of ink and to the nozzle substrate to provide the separate color channels for printing.

By duplicating a different longitudinal segment of the nozzle format of the single color pen to form each of the color nozzle groups, all of the printer control characteristics for the standard single color pen are utilized in color printing, requiring only that firmware and software be provided with the capability for color printing. Formatting must include the color dot stagger offset.

BRIEF DESCRIPTION OF THE DRAWINGS

The invention will be better understood by reference to the following specification when considered in conjunction with the accompanying drawings, in which.

DESCRIPTION OF THE PREFERRED EMBODIMENT

A disposable type thermal ink jet recording head or pen is employed in describing this invention. The invention, however, is not limited to a thermal ink jet type of pen, but is equally applicable to a piezoelectric type of ink jet pen. The printer or plotter in which the recording head or pen is mounted is not shown, it being understood that constant speed relative motion in one direction between the printing medium and the pen provides scanning for printing a line of text or graphics and that stepping relative motion between the printing medium and the pen in a direction orthogonal to the one direction positions the ink jet pen to print the next line of text or graphics.

Figure 1:
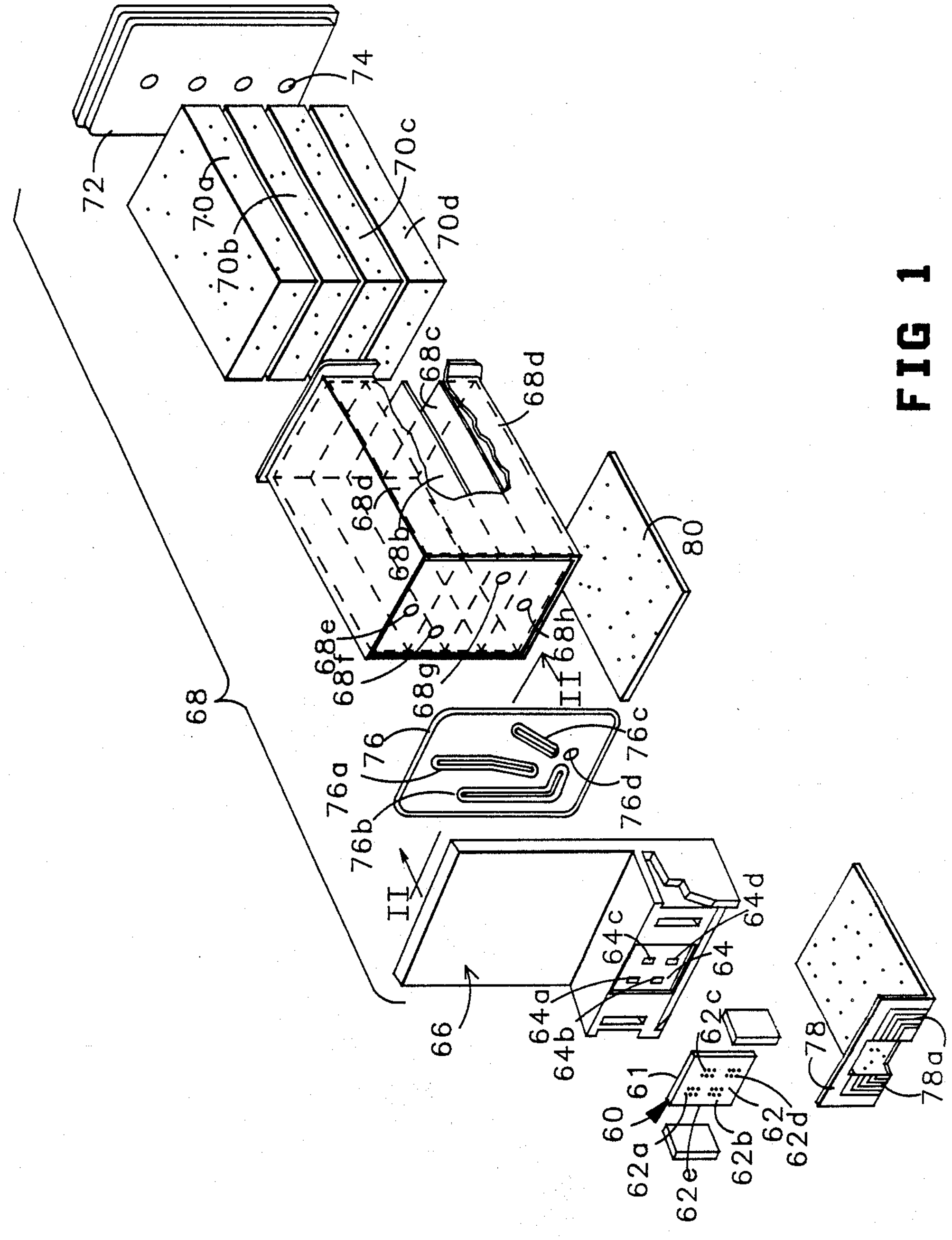
FIG. 1 is an exploded isometric view of a four color ink jet recording head or pen embodying the principles of this invention.
Figure 2:
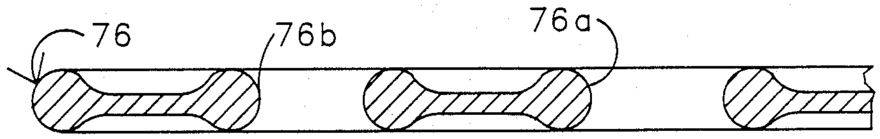
FIG. 2 is a cross sectional view of a sealing plate taken on the line II—II of FIG. 1.
Figure 5:
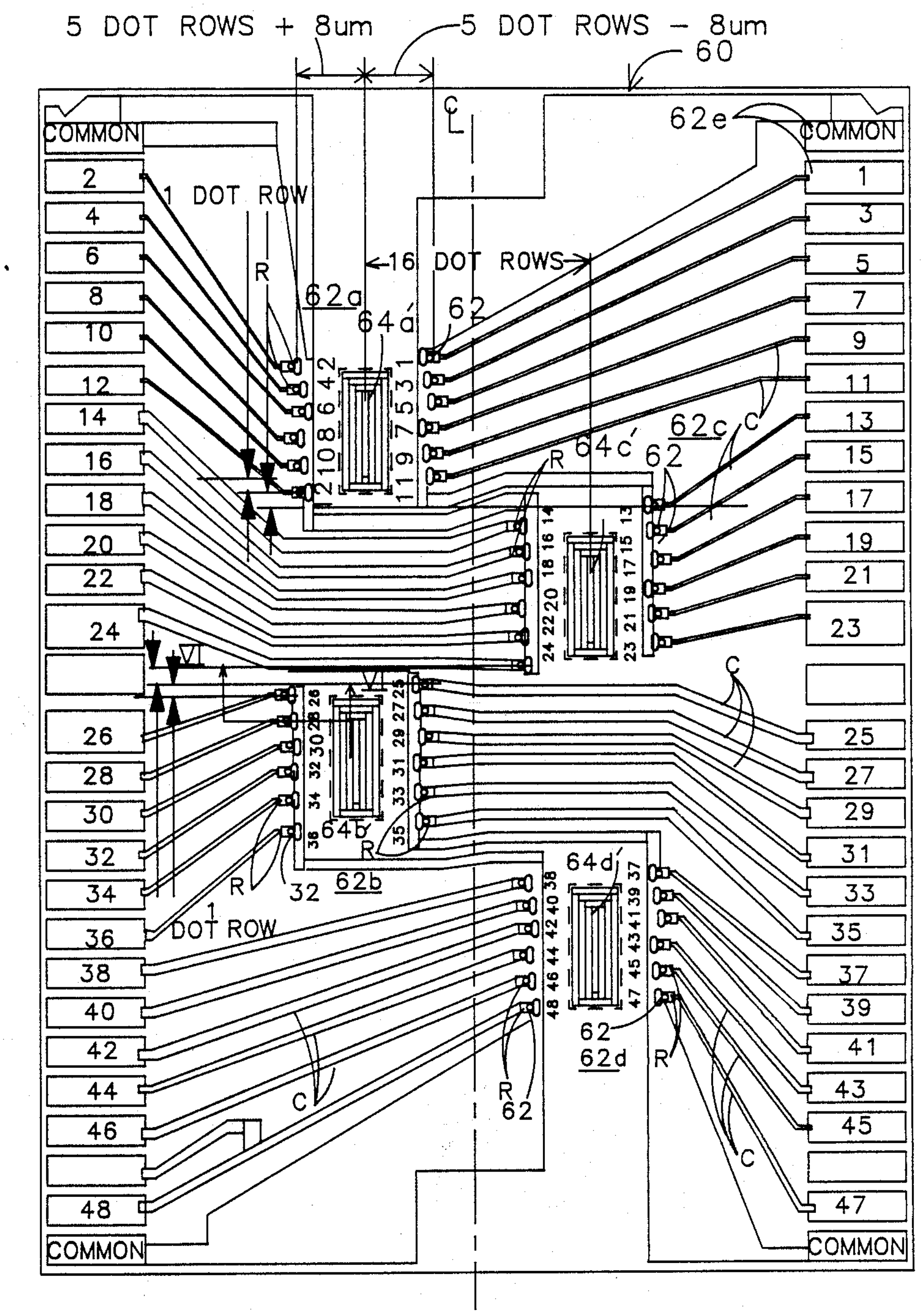
FIG. 5 the layout of the printhead of one embodiment of the recording head or pen of this invention.

In FIG. 1, the recording head or pen illustrated comprises a printhead 60. The printhead comprises an orifice or nozzle plate 60*a*, containing nozzles 62 arranged in four nozzle groups 62*a*, 62*b*, 62*c* and 62*cd*. The nozzle plate 60*a* is attached to a patterned substrate 61 forming part of the printhead, as seen in FIG. 5, having a thin film resistor array with an integral ink pathway. The printhead 60 is in turn sealed in a cavity or recess 64 in a front plate 66 which when assembled, is part of a plastic pen body 68 having individual ink chambers 68*a*, 68*b*, 68*c* and 68*d* which carry the ink supply. Each nozzle 62 supplies ink droplets on demand or command from a printer control system (not shown) as the pen scans the print medium. A suitable printer control system appears in the *Hewlett-Packard Journal* for May 1985. In the thermal ink jet type of pen, the droplets of ink are ejected by instantaneously vaporizing a tiny volume of ink. The vapor bubble grows rapidly displacing and giving momentum to the ink between the bubble and the nozzle, which expels the ink through the selected nozzle onto the print medium. Ink is refilled automatically in the nozzle as the vapor bubble collapses. Blocks of foam 70*a*, 70*b*, 70*c* and 70*d* are compressed in the respective chambers of the ink reservoir. Advantageously, this foam material may be a reticulated polyurethane foam of the type disclosed in copending application Ser. No. 880,774 of Jeffrey Baker et al, entitled "Thermal Ink Jet Pen Body Construction Having Improved Ink Storage and Feed Capability and Multicolor Ink Dispensing Capability and Low Cost Construction", filed July 1, 1986, assigned to the present assignee and incorporated herein by reference. These blocks of foam are individually saturated with ink of the selected color, typically black, yellow, cyan and magenta. When the foam is installed in the respective chambers, the reservoirs are sealed by a rear cover plate 72 provided with individual vent holes 74 for venting the respective ink chambers to the atmosphere. Provision (not shown) is made for preventing ink leakage out of these ports.

In one application, the pen is mounted with the nozzle plate 60*a* pointed downwardly. Ink is delivered to the nozzle plate under the influence of capillary force supplied by the ink pathway and the nozzles themselves.

The end face 69 as seen, of each of the foam filled ink chambers is provided with opening or parts opening. These are designated 68*e*, 68*f*, 68*g* and 68*h*. These are the ink chamber exit ports through which ink is delivered to each of the respective nozzle groups 62*a*, 62*b*, 62*c*, 62*d* in the printhead 60.

The individual ink paths for ink delivery from the ink chambers to the respective nozzle groups in the printhead 60 are defined by a sealing plate 76 having respective openings 76*a*, 76*b*, 76*c* and 76*d* therethrough, which provide the respective isolated channels or ink flow paths between the individual ports 68*e*-68*h*. and the individual ports 64*a*, 64*b*, 64*c*, 64*d*, respectively, opening through the front plate 66 into the recess 64 in which the printhead 60 is sealed. These ports, e.g. 64*a*-64*d*, are in the geometry of elongated slots herein, and such slot-feed ink flow techniques and related electrical interconnect methods are known in the art. These techniques and methods are described for example in U.S. Pat. Nos. 4,680,859 and 4,683,481 issued to S. A. Johnson and 4,635,073 issued to Gary E. Hanson, all assigned to the present assignee and incorporated herein by reference. The pattern of the ports 64*a*-64*d* corresponds to the pattern of the nozzle groups 62*a*-62*d* in the plate 60. The sealing plate 76 is provided with a beaded peripheral edge and beaded edges around each of the openings 76*a*-76*d* to provided positive sealing when compressed between the end face of the reservoir of the pen body 68 and the back face of the front plate 66.

When the front plate 66 of the pen body 68 is sealed in position compressing the sealing plate 76, individual ink paths are established from the respective ports 68*e*-68*h* via respective openings 76*a*-76*d* to the respective ports 64*a*-64*d* thus providing separate ink paths from the individual chambers 68*a*-68*d* to the respective nozzle groups 62*a*-62*d*.

In a thermal ink jet type of printhead 60, the patterned substrate 61 is provided with electrical contact pads 62*e* along the side edges of its face which individually communicate through circuit traces with the resistors at the nozzles which fire the drops of ink. These contact pads are schematically seen in FIG. 1. One patterned substrate format, detailing the circuit connections with the resistors, is seen in FIG. 5, which will be described at a later point. These contact pads are individually engaged by corresponding contact points on the back side of a flexible circuit 78 having flexible circuit traces 78*a* thereon. The flexible circuit 78 has an opening through its face which straddles the nozzle plate 260. The edges of this opening overlap the contact pads 62*e* and the contact points on flexible circuit are indexed with contact pads on the patterned substrate 61 to make electrical connections. This type of flexible circuit interconnection is described in the *Hewlett-Packard Journal*, dated May 1985 on page 14, which is included herein by reference. When the flexible circuit 78 is positioned with its circuit traces 78*a* in contact with the contact pads 62*e* of the patterned substrate 61, its bottom extension extends beneath the pen body 68. Here it is attached to the bottom side of the ink reservoir by an adhesive pad 80 or other fastening means.

Figure 3:
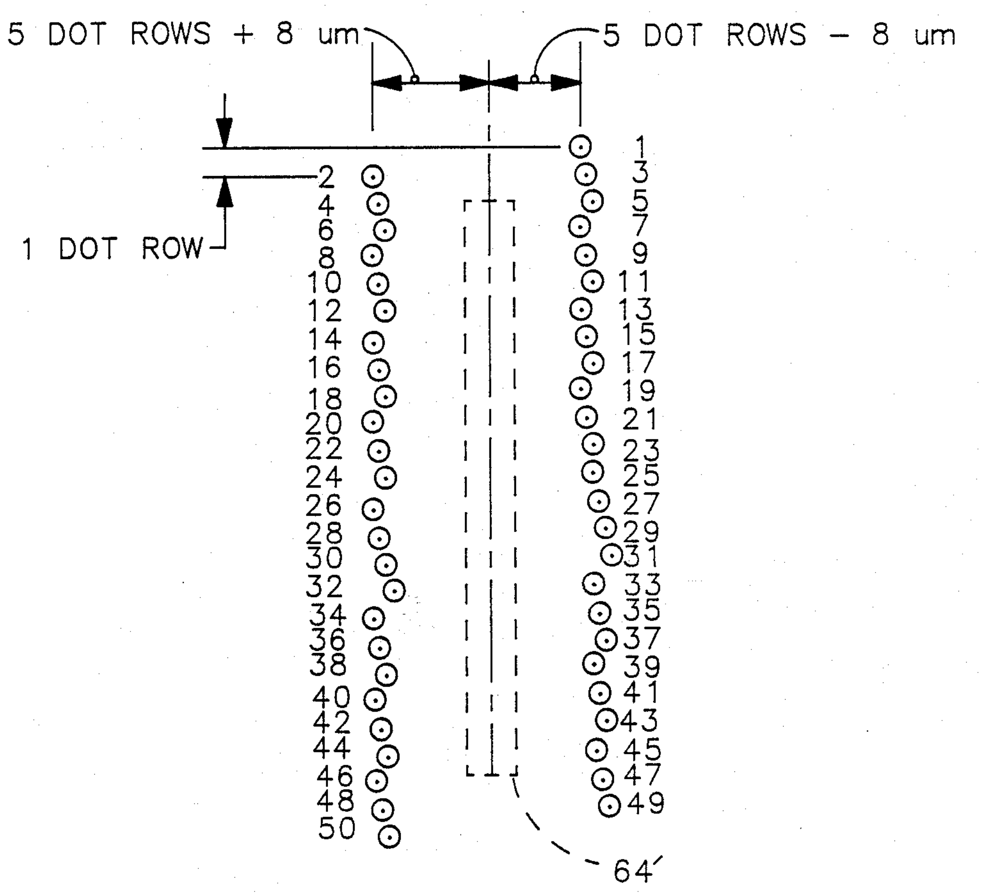
FIG. 3. illustrates the layout or format of the nozzles of a single color printhead for a recording head or pen.

To illustrate the adaptability of this multichamber ink jet recording head or pen single color printers, reference is made to FIG. 3 of the drawings and to Table I herebelow. FIG. 3 illustrates a pattern or format of one type of single color nozzle or orifice plate. This nozzle plate comprises two columns of nozzles, there being 25 nozzles in each column. The nozzles in each column are arranged in staggered groups of 3, as seen. The nozzles in the right column which are the odd numbered nozzles, 1-49, are displaced vertically, as viewed, with respect to the nozzles in the left column which are the even numbered nozzles, 2–50, by one-half the distance between the nozzles in the columns. The distance between the nozzles in the right column and the left column measured in a direction parallel to the columns, as indicated, is identified as one dot row or logical print position. The distance between the nozzle center line and the top nozzle in each row measured horizontally for nozzle number 1 is 5 dot rows minus 8 um and for the nozzle number 2 is 5 dot rows plus 8 um. The horizontal distance between corresponding nozzles is 10 dot rows. In one practical embodiment of this single color nozzle format or pattern, a dot row or logical print position is 0.0033 inches and the total distance between corresponding nozzles, such as nozzle 1 and nozzle 2, is typically 10 dot rows and thus 0.033 inches. The nozzles are staggered in the columns, typically in groups of three (3).

TABLE I

| FIRING SEQUENCE | SHIFT OFFSET (1PP) 0 | SHIFT OFFSET (1PP) 10 | TIMING OFFSET (UM) |
|---|---|---|---|
| 0 | 20,46 | 19,45 | 0.0 |
| 1 | 14,40 | 13,39 | 2.5 |
| 2 | 8,34 | 7,33 | 5.5 |
| 3 | 2,28 | 1,27 | 8.0 |
| 4 | 22,48 | 21,47 | 11.0 |
| 5 | 16,42 | 15,41 | 13.5 |
| 6 | 10,36 | 9,35 | 16.5 |
| 7 | 4,30 | 3,29 | 19.0 |
| 8 | 24,50 | 23,49 | 22.0 |
| 9 | 18,44 | 17,43 | 24.5 |
| 10 | 12,38 | 11,37 | 27.5 |
| 11 | 6,32 | 5,31 | 30.0 |
| 12 | 26 | 25 | 33.0 |

Figure 4:
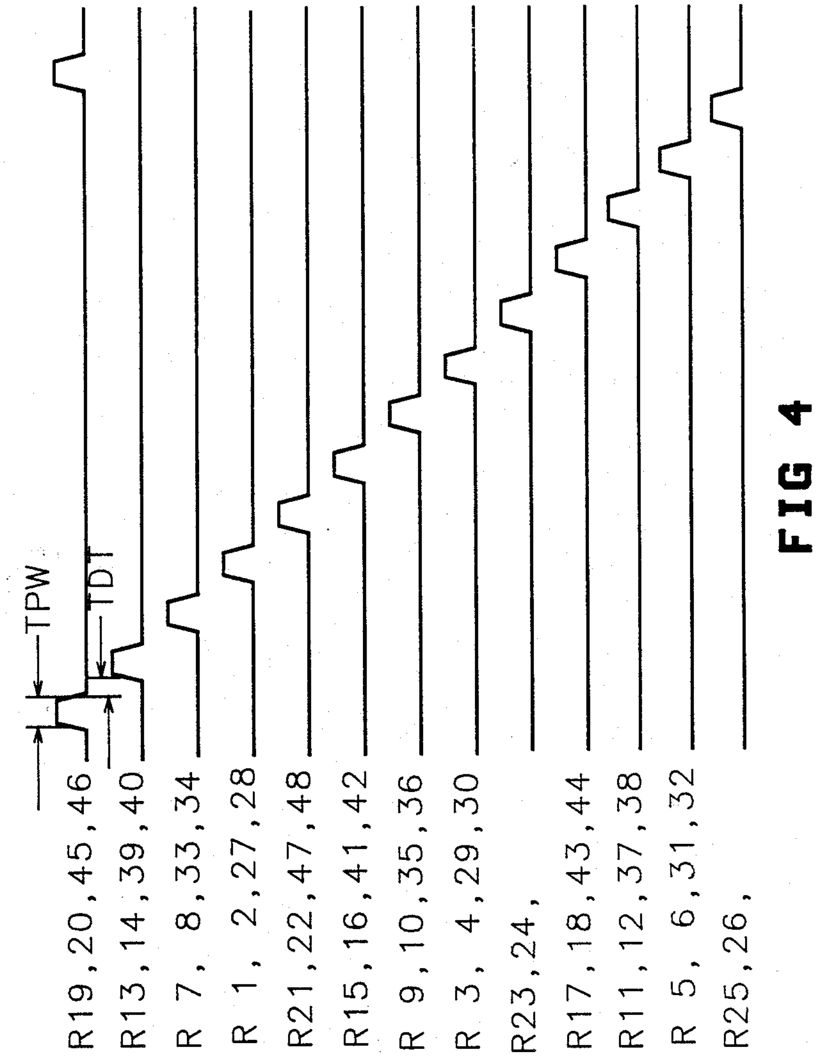
FIG. 4 is a resistor firing timing signal diagram for the nozzle format of FIG. 3.

Table I illustrates the firing sequence of the resistors associated with each of the nozzles of FIG. 3. The timing signal diagram for firing the nozzles of the nozzle array of FIG. 3 is seen in FIG. 4, identifying the resistors fired with each pulse. The number in each resistor character identifies the nozzle. The resistors on the recording head or print head 60 must be fired in a particular order to minimize cross talk. The location of the orifices is set so that the dots will all be fired in the same vertical column when there is a constant scan or printing velocity, typically 12 in./sec., with a 3.25 usec. electrical pulse width TPW and a 5.75 usec dead time TDT, or interval between pulses. The dot firing sequence and relative nozzle locations in microns are specified in Table I. When printing left to right, the indicated sequence is used. When printing right to left, the resistors are fired in the reverse sequence.

In the single color ink jet recording head, the printhead 60 comprises the 2 columns of nozzles as seen in FIG. 3. A single opening is all that is required to provide communication between a single ink chamber 68 in the pen body and the nozzle plate 60*a*. This opening is configured as a slot 64*e*, as seen in FIG. 3, at the point where it opens through the face of a recess in which the nozzle plate is mounted, such as the recess 64 of FIG. 1.

The single color nozzle format or pattern of FIG. 3 is retained in the individual nozzle groups of the printhead 60 as seen in FIG. 5. In effect, the nozzle column of FIG. 3 is divided by four. Each nozzle group 62*a*–62*d* comprises 12 nozzles arranged in 2 columns of 6 having the dot row spacing between corresponding nozzles of the respective rows and having the same column spacing. Thus within each nozzle group the ink drop firing sequence is the same as that of the single color pen.

In the arrangement shown in FIG. 5, the common contact pads are shown in the four corners of the substrate 61 of the printhead 60. A circuit trace from the common contact pad in the upper left corner of the substrate 61 connects to the resistors R of the even numbered nozzles of the nozzle groups 62*a* and 62*c*. The common contact pad in the upper right hand corner of the substrate 61 connects to the resistors R of the odd numbered nozzles of the nozzle group 62*a* and 62*c*. The common contact pad in the bottom left corner of the substrate 61 connects to the resistors R of the even numbered nozzles of the nozzle groups 62*b* and 62*d* and finally the common contact pad in the bottom right corner of the substrate 61 connects to the resistors R of the odd numbered nozzles of the nozzle groups 62*b* and 62*d*. The remaining contact pads numbered 1–48 are connected by circuit traces C to individual resistors R of correspondingly numbered nozzles in the individual nozzle groups.

Only 48 of the 50 nozzles of FIG. 3 are needed in developing the nozzle and circuit format of the printhead 60 of FIG. 5. Two nozzles must be eliminated from FIG. 3. A factor to be considered in the resistor firing sequence in the arrangement of FIG. 5 is the need to avoid firing resistors together which are coupled by a common ground circuit trace. For example, the resistors R at nozzles 45 and 31 should not be fired together since they are coupled to the same common or ground circuit trace, the reason being that resistor firing voltages are critical. Some voltage overdrive is required to guarantee ink drop development. But excessive overdrive shortens resistor life. Thus the firing voltages are kept as low as possible while still guaranteeing firing. The IR drop in a ground circuit trace when two resistors in that circuit are fired simultaneously may result in uncertain ink drop formation.

One approach to solving this problem, while still retaining the firing sequence of the single color head, when the nozzle array of FIG. 3 is divided in developing the nozzle and circuit format or pattern or FIG. 5, is to eliminate the resistors and nozzles 25 and 26. When this is done, the resistors and nozzles 27 to 50 are moved up in the columns to maintain the 1 dot row spacing. Thus resistors and nozzles 27 and 28 move up into the positions occupied by resistors and nozzles 25 and 26 and those that follow shift correspondingly. Thus nozzles and resistors 27 and 28, occupying positions 25 and 26 must now be fired in the 25 and 26 position sequences, although they are still fired in the old 27 and 28 timing sequences, thus allowing for the same driver electronics. Similar considerations apply to the remainder of the higher numbered resistors and nozzles.

Table IIA below is the firing sequence for the nozzles and resistors based upon this development approach for the printhead 60 of FIG. 5, showing the shift offset required in dot rows or logical print positions in firing the individual resistors.

TABLE IIA

| FIRING SEQUENCE | 0 | 10 | 16 | 26 | TIMING OFFSET (UM) |
|---|---|---|---|---|---|
| 0 | | | 20 44 | 19 43 | 0 |
| 1 | | | 14 38 | 13 37 | 2.5 |
| 2 | 8 32 | 7 31 | | | 5.5 |
| 3 | 2 26 | 1 25 | | | 8.0 |
| 4 | | | 22 46 | 21 45 | 11.0 |

TABLE IIA-continued

| FIRING SEQUENCE | 0 | | 10 | | 16 | | 26 | | TIMING OFFSET (UM) |
|---|---|---|---|---|---|---|---|---|---|
| 5 | | | | | 16 | 40 | 15 | 39 | 13.5 |
| 6 | 10 | 34 | 9 | 33 | | | | | 16.5 |
| 7 | 4 | 28 | 3 | 27 | | | | | 19.0 |
| 8 | | | | | 24 | 48 | 23 | 47 | 22.0 |
| 9 | | | | | 18 | 42 | 17 | 41 | 24.5 |
| 10 | 12 | 36 | 11 | 35 | | | | | 27.5 |
| 11 | 6 | 30 | 5 | 29 | | | | | 30.0 |
| 12 | | | | | | | | | 33.0 |

An alternative and presently preferred approach to selecting 48 of the 50 nozzles of FIG. 3 while avoiding firing two resistors in a single ground trace, is to eliminate nozzles and resistors 49 and 50. The resistor firing sequence for this arrangement is shown in Table IIB below.

TABLE IIB

| FIRING SEQUENCE | 0 | | 10 | | 16 | | 26 | | TIMING OFFSET (UM) |
|---|---|---|---|---|---|---|---|---|---|
| 0 | | | | | 20 | 46 | 19 | 45 | 0 |
| 1 | | | | | 14 | 40 | 13 | 39 | 2.5 |
| 2 | 8 | 34 | 7 | 33 | | | | | 5.5 |
| 3 | 2 | 28 | 1 | 27 | | | | | 8.0 |
| 4 | | | | | 22 | 48 | 21 | 47 | 11.0 |
| 5 | | | | | 16 | 42 | 15 | 41 | 13.5 |
| 6 | 10 | 36 | 9 | 35 | | | | | 16.5 |
| 7 | 4 | 30 | 3 | 29 | | | | | 19.0 |
| 8 | | | | | 24 | | 23 | | 22.0 |
| 9 | | | | | 18 | 44 | 17 | 43 | 24.5 |
| 10 | 12 | | 11 | | | 38 | | 37 | 27.5 |
| 11 | 6 | 32 | 5 | 31 | | | | | 30.0 |
| 12 | | 26 | | 25 | | | | | 33.0 |

The printhead 60 of FIG. 5 is arranged as four groups of 12 nozzles with each group associated with one of the four ink colors. Each 12 nozzle group is arranged as two columns of 6 nozzles separated by 10 logical, print positions or dot rows. The four nozzle nozzle groups are arranged such that the two columns of groups are laterally offset from each other by 16 logical print or dot row positions. When firing the nozzles, data for nozzle groups 62*c*, 62*d* is shifted 16 dot rows from the rest of the nozzle data to adjust for the group offset. With the nozzle group data shifted, the multicolor nozzle format or pattern is the same as two columns of 25 nozzles separated by 10 dot rows, the format of FIG. 3. The resistors are fired in a specific order to minimize internozzle crosstalk. The location of the nozzles has been set (Timing Offset) so that the dots in one of the 25 nozzle equivalent columns (after stagger correction of the nozzle groups) will all be fired in the same vertical column when the head is moving at 30.48 cm/sec (12 in/sec) horizontally (with a 3.25 usec pulse width and 5.75 usec dead time). The dead time is adjusted to suit a selected carriage constant velocity.

The dot firing sequence and relative orifice locations are shown in Tables IIA and IIB. When printing left to right, the indicated sequence should be used with the Shift Offset being data delay units. When printing right to left, the resistors should be fired in the reverse sequence with the Shift Offset being data advance units. The resultant print will be a vertical column of dots as though all nozzles were located in a line at the physical position of the first nozzle to fire when the sequence started.

Figure 6:
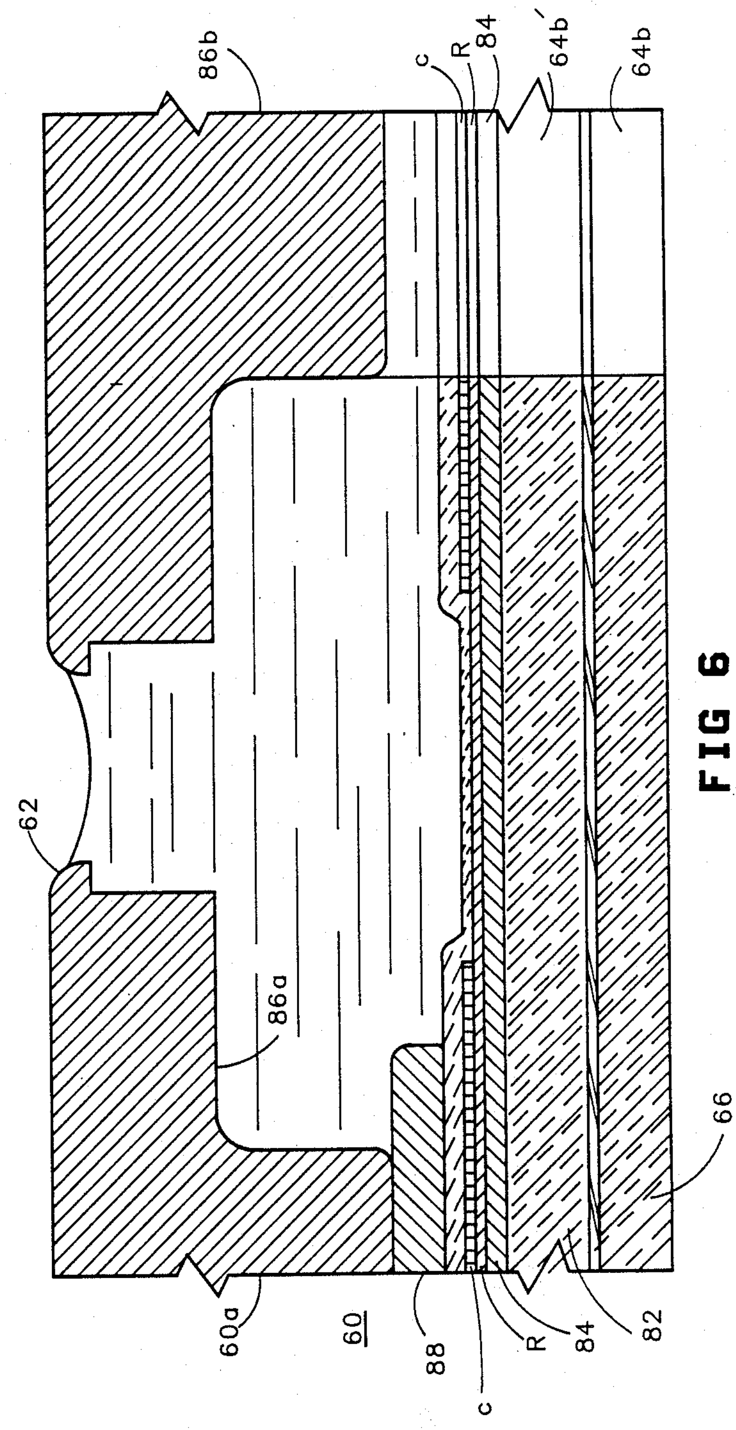
FIG. 6 is a cross sectional view of one nozzle of the printhead taken on the line VI—VI of FIG. 5.

The location of individual nozzles 62 in FIG. 5 is shown only as a small circle over the individual resistors. The nozzle or orifice plate 60*a* detail is not shown in this figure to minimize confusion in an already highly detailed drawing. By way of explanation with regard to the nozzle plate 60*a*, reference is made to FIG. 6 depicting an enlarged cross sectional view through a section of the printhead 60 taken on the line VI—VI of FIG. 5. This section line is shown at the top left side of the nozzle group 62*b* and is a section through nozzle 28. Other even numbered nozzles are the same. Odd numbered nozzles are reversed.

As described in the *Hewlett-Packard Journal.* referenced hereinabove, particularly in the article entitled "Development of the Thin-Film Structure for the ThinkJet Printhead" beginning on page 27 of that journal, the printhead 60 comprises a glass substrate 82 on which a silicon dioxide barrier, $SiO_2$, 84, is deposited. The individual resistors are tantalum aluminum, TaAl. The circuit traces C for the individual resistors R are next deposited to connect the resistors to the respective contact pads. A passivation layer P is next deposited to protect the resistor R from reacting directly with the ink. The ink being an effective electrolyte, isolation is required. The passivation layer permits heat transfer from the resistor to the ink while providing physical, chemical and electrical isolation from the ink.

A nozzle plate 60*a* is electroformed over a mandrel. Usually this nozzle plate is electroformed of nickel. It comprises a body defining individual ink cavities, or priming cavities 86*a* into which the ink is admitted. This cavity opens into the nozzle 62. The ink meniscus line is shown bridging the nozzle opening. The ink cavities for the even and odd numbered nozzles in each nozzle group are joined by a manifold, defining a manifold cavity 86*b* extending between the nozzles, which bridges an opening 64*b'* in the glass substrate 82 and the layers deposited thereon. This opening 64*b'* registers with the opening 64*b* at the location of the section line VI—VI as seen in FIG. 5. The separately electroformed nozzle plate 60*a* is bonded to the laminated substrate structure by means of a polyimide or polymer material 88, such as RISTON or VACREL, which are trade name polymer materials of the E.I. DuPont Company of Wilmington, Del. The polymer material 88 is disposed on the laminated substrate over the area covered by the nozzle plate 60*a* around and between the nozzle groups, as seen in FIG. 5, and outlines the cavities 86*a* and the manifold 86*b* therebetween in the nozzle groups. The staggering or offseting of the nozzle groups provides adequate polymer sealing between the nozzle plate and the substrate to achieve ink isolation and improves the substrate strength around the ink feed holes 64*a*-64*d*.

Another design of the nozzle plate structure is provided in U.S. Pat. No. 4,694,308, to C. S. Chan, et al, filed Nov. 22, 1985, entitled "Barrier Layer and Orifice Plate for Thermal Ink Jet Printhead Assembly; assigned to the assignee of this invention and incorporated herein by reference.

As seen in FIG. 5, the individual nozzles 62 in a group of nozzles are 1 dot row apart and the nozzles between the four nozzle groups are preferably, but not limited to, 1 dot row apart, in the paper motion or stepping direction, there being 12 nozzles in each nozzle group. In the example described herein, each nozzle group can print a nozzle stripe which is 0.04 inches wide. Thus a paper step of 0.04 inches permits color overlaying on subsequent passes. In the scan direction, the nozzle groups are staggered or offset by 8 dot rows off the center line indicated in FIG. 5. This provides for an effective stagger of affect 16 dot rows between the centers of the color groups. In the embodiment of this invention which is being described, this stagger or offset allows approximately 20 mils between the ink cavities for sealing with the polymer material. This sealing line is roughly equivalent to the ink cavity to the outside seal.

The ink supply from the pen body is also eased by the increasing clearance due to the stagger. Adequate sealing and separation the back side of the glass substrate in the recess 64 of the front plate 66 is possible with this increased clearance.

The division of the ink reservoir of the single color pen into four cavities results in a total volume of ink, that is the volume of all of the colors, which is somewhat less than an all black or single color pen.

Since 1 dot row spacing can be maintained between the nozzles in the individual nozzle groups and the nozzles between the nozzle groups, this multichamber recording head or pen has the same continuous dot per inch dot spacing with four color capability as the single color printhead. This utilizes all of the single color printer system text and graphics control characteristics and requires only that firmware and software have the color capability. Formatting must be provided to provide the 16 dot row stagger offset between the nozzle groups.

Figure 7:
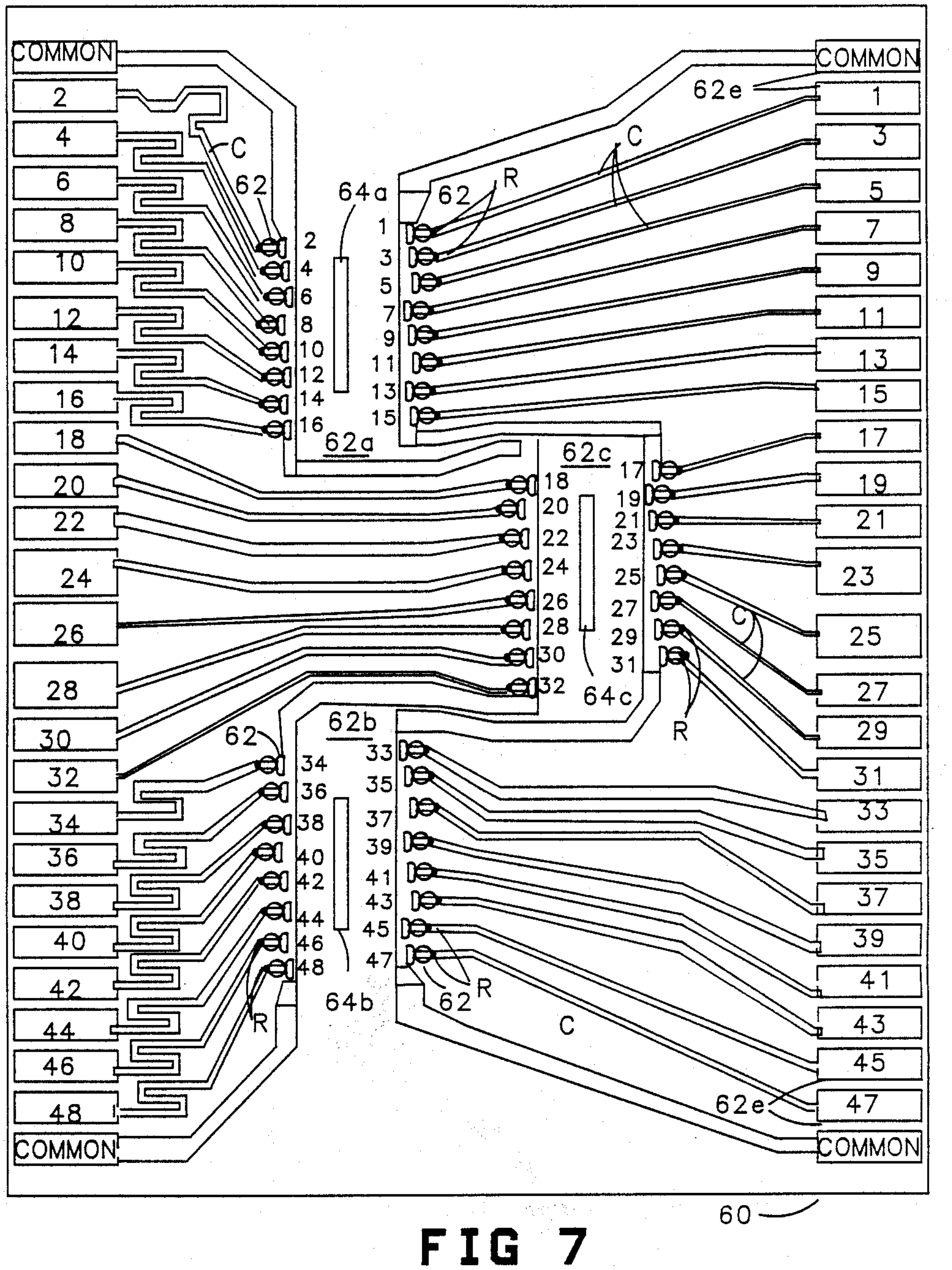
FIG. 7 illustrates the layout of the printhead of a second embodiment of the recording head or pen of this invention.

FIG. 7 illustrates another embodiment of this invention in which the single color nozzle plate of FIG. 3 is modified in a printhead to accommodate three nozzle groups in a three chamber ink jet pen or recording head. Each nozzle group comprises 16 nozzles in two columns of 8 occupying the same positions in the individual columns as the correspondingly numbered nozzles in FIG. 3.

The nozzles of this printhead are arranged as three groups of 16 nozzles each, each group being associated with one of the three ink colors. The nozzles of each of the 16 nozzle groups are arranged as two columns of 8 nozzles separated by 10 logical print positions or dot rows. The three nozzle groups are arranged such that the middle group **62*c* is offset from the other two groups by 16 logical print or dot row positions. When firing the printhead, data for nozzles 17–32 should be shifted 16 logical print positions or dot rows from the rest of the nozzle data to adjust for the middle group offset. With the middle nozzle group data shifted, the nozzle arrangement is the same as that of two columns of 25 nozzles separated by 10 dot rows, as seen in FIG. 3**. The nozzle resistors R are fired in a specific order to minimize internozzle crosstalk. The location of the nozzles has been set (Timing Offset) so that the dots in one of the 25 nozzle equivalent columns (after stagger correction of the middle nozzle group) will all be fired in the same vertical column when the head is moving at 30.48 cm/sec (12 in/sec) horizontally (with a 3.25 usec pulse width and 5.75 usec dead time). The dead time is adjusted to suit a selected carriage velocity.

The dot firing sequence and relative orifice locations are shown in Table III. When printing left to right, the indicated sequence should be used with the Shift Offset being data delay units. When printing right-to-left, the resistors should be fired in the reverse sequence with the Shift Offset being data advance units. The resultant print will be a vertical column of dots as though all nozzles were located in a line at the physical position of nozzle 46 when the sequence started.

TABLE III

| FIRING SEQUENCE | | 0 | | | 10 | | 16 | 26 | TIMING OFFSET (UM) |
|---|---|---|---|---|---|---|---|---|---|
| 0 | | 46 | | | 45 | | 20 | 19 | 0.0 |
| 1 | 14 | | 40 | 13 | | 39 | | | 2.5 |
| 2 | 8 | | 34 | 7 | | 33 | | | 5.5 |
| 3 | | 2 | | | 1 | | 28 | 27 | 8.0 |
| 4 | | 48 | | | 47 | | 22 | 21 | 11.0 |
| 5 | 16 | | 42 | 15 | | 41 | | | 13.5 |
| 6 | 10 | | 36 | 9 | | 35 | | | 16.5 |
| 7 | | 4 | | | 3 | | 30 | 29 | 19.0 |
| 8 | | | | | | | 24 | 23 | 22.0 |
| 9 | | 44 | | | 43 | | 18 | 17 | 24.5 |
| 10 | 12 | | 38 | 11 | | 37 | | | 27.5 |
| 11 | | 6 | | | 5 | | 32 | 31 | 30.0 |
| 12 | | | | | | | 26 | 25 | 33.0 |

We claim:

1. A multichamber ink jet pen for a recording apparatus, comprising:

a pen body having a plurality of ink chambers;

a printhead having a plurality of spaced openings therein and a nozzle group at each opening;

means mounting said printhead on said pen body;

means providing respective individual passages between said chambers and said openings at said printhead at said nozzle groups, providing an individual ink path between each chamber and a corresponding nozzle group;

each nozzle group comprising at least two parallel columns of equally spaced nozzles;

each of said parallel columns of spaced nozzles in a nozzle group has the same number of nozzles, the nozzles of one column of nozzles in a nozzle group being displaced in a direction along the one column, one half of a nozzle space with respect to the nozzles of the other column of nozzles in that nozzle group, defining an ink dot row space between corresponding nozzles in the tow columns in a nozzle group, measured in a direction paralleling the columns of nozzles;

the center of the columns of nozzles in one nozzle group being parallel to the center of the columns of nozzles in an adjacent group, the centers of the columns being laterally spaced apart a distance greater than the distance between nozzle columns of a nozzle group, providing two spaced, parallel columns of nozzle groups; and the lowermost end nozzle in a nozzle column of one nozzle group being spaced one dot row space from the uppermost end nozzle in a nozzle column of an adjacent nozzle group, measured in a direction paralleling the nozzle columns.

2. The invention according to claim 1, wherein each named distance comprises a predetermined number of dot row spaces.

3. The invention according to claim 1, wherein the first named distance comprises 16 dot row spaces and the second named distance comprises 10 dot row spaces.

4. A multi-color inkjet pen having a plurality of nozzle groups disposed in end-to-end relationship, each having predefined length and width dimensions, each nozzle group receiving a different color of ink and each nozzle group being laterally offset with respect to each adjacent nozzle group by at least a distance greater than said width dimension, whereby a sealing surface area is provided between and around each nozzle group for isolating the respective colors of ink at each nozzle group.

5. A multi-color inkjet pen, comprising:

a plurality of nozzle groups having predefined length and width dimensions, alternately disposed in laterally offset predetermined end-to-end relationship, maintaining uniform nozzle spacing within and between the nozzle groups;

each nozzle group receiving a different color of ink; and the lateral offset distance between alternate nozzle groups being greater than said width dimension while maintaining said predetermined end-to-end relationship;

whereby a sealing surface area is provided between and around each nozzle group for isolating the respective colors of ink at each nozzle group.

6. In a recording apparatus, a multi-color inkjet pen for interchangeable use with a single color inkjet pen having a predetermined nozzle column pattern, said multi-color inkjet pen comprising:

an inkjet pen structure having a plurality of separate ink and a corresponding plurality of nozzle groups which are each connected to a different ink chamber to be supplied with ink solely therefrom;

each nozzle group duplicating a different longitudinal segment of the nozzle column pattern of said single color inkjet pen, the sum of the nozzles in all of the nozzle groups being no greater than the number of nozzles in the nozzle column pattern of the single color pen;

said nozzle groups being alternately disposed in two columns in a non-overlapping, end-to-end sequence, duplicating the longitudinal spacing of the nozzles of the nozzle column pattern of said single color pen within and between said nozzle groups.

7. In a recording apparatus, a multi-color inkjet pen for interchangeable use with a single color inkjet pen having a predetermined nozzle column pattern, said multi-color inkjet pen comprising:

a pen body having a plurality of ink chambers;

a printhead on said pen body, said printhead having a plurality of spaced openings therein and a nozzle group communicating with each opening;

means providing individual passages between said ink chambers and said openings in said printhead for supplying ink to each nozzle group;

each nozzle group duplicating a different nozzle column segment of the nozzle column pattern of said single color inkjet pen and comprising a number of nozzles representing a selected sub-multiple of the total number of nozzles of the single color inkjet pen; and said nozzle groups being positioned in end-to-end relationship on said printhead in a pattern maintaining the nozzle column direction, the nozzle sequence and the nozzle spacing of the nozzle column pattern of the single color inkjet pen.

8. The multi-color inkjet pen of claim 7, wherein the total number of the nozzles in all nozzle groups does not exceed the number of nozzles in the single color inkjet pen.

9. The multi-color inkjet pen of claim 7, wherein alternate nozzle groups are laterally offset a distance greater than the width of a nozzle group, providing two spaced, parallel columns of nozzle groups.

10. The multi-color inkjet pen of claim 7, wherein said predetermined nozzle column pattern, comprises two columns of equally spaced nozzles, the nozzles of one column being displaced one-half of a nozzle space from the nozzles of the other column, measured in a direction paralleling the columns.

11. The multi-color inkjet pen of claim 10, wherein predetermined numbers of adjacent nozzles in each of the two columns are located along lines which are correspondingly slanted from the longitudinal axis of the respective nozzle columns.

* * * * *

UNITED STATES PATENT AND TRADEMARK OFFICE
CERTIFICATE OF CORRECTION

PATENT NO. : 4,812,859

DATED : March 14, 1989

INVENTOR(S) : C. S. Chan et al

It is certified that error appears in the above-identified patent and that said Letters Patent is hereby corrected as shown below:

Column 2, line 36, insert --.-- between "pen" and "Construction";

Column 3, line 66, delete "opening or parts opening" and insert --openings or ports--;

Column 4, line 47, delete "260", insert --60a--;

Column 4, line 60, insert --to-- between "pen" and "single";

Column 7, line 39, delete the first occurance of "nozzle";

Column 7, line 40, insert --nozzle-- between "of" and "groups";

Column 9, line 3, delete "of affect, insert --or offset of--;

Column 9, line 11, insert --on-- between "separation" and "the";

Column 10, line 38, delete "tow", insert --two--;

Column 11, line 24, insert --chambers-- after "ink".

Signed and Sealed this

Seventh Day of May, 1991

*Attest:*

HARRY F. MANBECK, JR.

*Attesting Officer*

*Commissioner of Patents and Trademarks*